United States Patent [19]

Smart et al.

[11] 4,301,775
[45] Nov. 24, 1981

[54] MANIFOLDS FOR INTERNAL COMBUSTION ENGINES

[75] Inventors: Charles A. Smart, Hornchurch; Robert A. Shackleton, Rayleigh, both of England

[73] Assignee: Ford Motor Company, Dearborn, Mich.

[21] Appl. No.: 42,673

[22] Filed: May 25, 1979

[30] Foreign Application Priority Data

May 30, 1978 [GB] United Kingdom ............... 24518/78

[51] Int. Cl.³ .............................................. F02B 29/00
[52] U.S. Cl. ............................ 123/52 M; 123/52 MC
[58] Field of Search ............ 123/52 R, 52 M, 52 MC, 123/52 MV, 59 R

[56] References Cited

U.S. PATENT DOCUMENTS

| | | | |
|---|---|---|---|
| 1,744,319 | 1/1930 | Link | 123/52 M |
| 3,206,836 | 9/1965 | Schlussler | 29/157 |
| 3,324,533 | 6/1967 | Watteau | 123/41.31 |
| 3,718,172 | 2/1973 | Rice et al. | 164/75 |
| 3,831,566 | 8/1974 | Thomas | 123/52 M |
| 3,884,202 | 5/1975 | Sakurai | 123/122 AB |
| 3,895,617 | 7/1975 | Sakurai | 123/122 AB |
| 3,994,270 | 11/1976 | Nakano et al. | 123/122 AB |
| 3,994,271 | 11/1976 | Ishizuya et al. | 123/52 M |
| 4,108,124 | 8/1978 | Nakagawa et al. | 123/52 M |
| 4,111,163 | 9/1978 | Ederer et al. | 123/52 M |
| 4,165,720 | 8/1979 | Barcak | 123/41.31 |

FOREIGN PATENT DOCUMENTS 1476372 3/1969 Fed. Rep. of Germany ........ 60/321

Primary Examiner—Craig R. Feinberg
Attorney, Agent, or Firm—Steven L. Permut; Clifford L. Sadler

[57] ABSTRACT

A manifold for an internal combustion engine comprises a plurality of body parts each formed as an integral casting by pressure casting. A first body part has a mounting flange for the manifold, a plurality of open channels communicating with respective apertures in the mounting flange, and a water chamber communicating with a port in the flange and a further port in the first body part. A second body part overlies the channels so that the first and second body parts define a plurality of gas conduits effecting communication between the apertures and a common orifice. The first and second parts are sealed together along opposed side faces adjacent their outer peripheral edges. The seal along opposing sides allows access to the joints from the exterior of the assembly, permitting connection by electron beam welding or an adhesive, since all the joints are located on the exterior of the assembly a smoother interior surface is preserved and visual inspection of each joint is possible as it is made.

7 Claims, 2 Drawing Figures

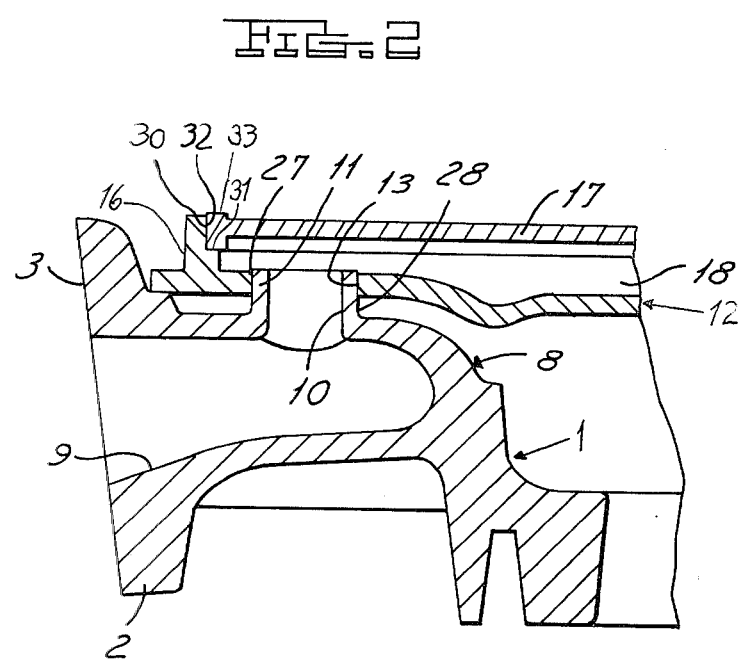

MANIFOLDS FOR INTERNAL COMBUSTION ENGINES

BACKGROUND OF THE INVENTION

1. Field of the Invention

This invention relates to manifolds for internal combustion engines.

2. Description of the Prior Art

Conventional manifolds for internal combustion engines comprise a system of internal conduits communicating at one end with a series of apertures in a mounting flange, and at the other end with a common opening in the manifold. The manifolds are usually formed by gravity casting using a metal die and a sand core. The resulting castings generally have a poor surface finish. The mounting flange, therefore, requires machining to provide a flat surface which can be sealed to the internal combustion engine block, and the rough internal surface provides resistance to the flow of gases through the manifold.

Manifolds have been produced by pressure casting which produces a smooth finish on the internal and external surfaces of the casting, so that further machining of the casting is unnecessary and the casting has good flow properties. In a pressure casting process, the manifold cannot normally be produced as a single casting since solid cores are used to form the internal configuration of the manifold. Pressure moulded manifolds are, therefore, produced with two or more body parts which are sealed together after formation. The formation of effective and durable seals between the two components presents a considerable problem, particularly where the manifold includes an internal passages jacket for heat exchange with the gases passing through the manifold.

SUMMARY OF THE DISCLOSURE

According to the present invention, there is provided a manifold for an internal combustion engine comprising a plurality of body parts each formed as an integral casting, a first body part having a mounting flange for the manifold, a plurality of open channels communicating with respective apertures in the mounting flange and a water chamber communicating with a port in the flange and a further port in the first body part, a second body part overlying the channels so that the first and second body parts define a plurality of gas conduits effecting communicating between the apertures and a common orifice, the first and second parts being sealed together along opposed side faces adjacent their outer peripheral edges.

By forming the seals between the first and second body parts along opposed side faces adjacent the outer peripheral surfaces rather than along abutting end faces, the joint between the two body parts is accessible from the exterior of the manifold thus allowing the joint to be made by welding, preferably electron beam welding. Alternatively, an adhesive such as an epoxy resin may be used to effect the seal, and can be applied externally, allowing for visual inspection of the joint. Moreover, penetration of adhesive into the interior of the manifold is reduced, thus preserving the smoothness of the internal surfaces of the manifold. Additionally, by forming the water chamber integrally with one of the body parts, internal seals between the two parts can be avoided.

Preferably, the second body part defines an aperture which surrounds the said further port in the first body part and is sealed thereto along side faces adjacent the edges of the aperture and the further port, thus enabling a similar sealing technique to be used as between the peripheral surfaces of the first and second body parts.

In a preferred embodiment of the invention, the second body part carries a third body part which co-operates therewith to define a further water chamber effecting communication between the aperture in the second body part and an opening in the third body part, the third body part having a side face adjacent its outer peripheral edge which faces and is sealed to a sealing surface on the second body part, thus allowing the seal between the second and third body parts to be formed by the same techniques as described above.

The first and second body parts and, preferably also, the second and third body parts, are desirably sealed together along seams which, in each case, lie in parallel, or common, planes, thus facilitating assembly by means of automatic electron beam welding apparatus.

BRIEF DESCRIPTION OF THE DRAWINGS

A preferred embodiment of the invention will now be described by way of example only, with reference to the drawings in which:

FIG. 2 is a partial cross-section on an enlarged scale taken along the lines A—A in FIG. 1.

DETAILED DESCRIPTION OF THE PREFERRED EMBODIMENT

Figure 1:
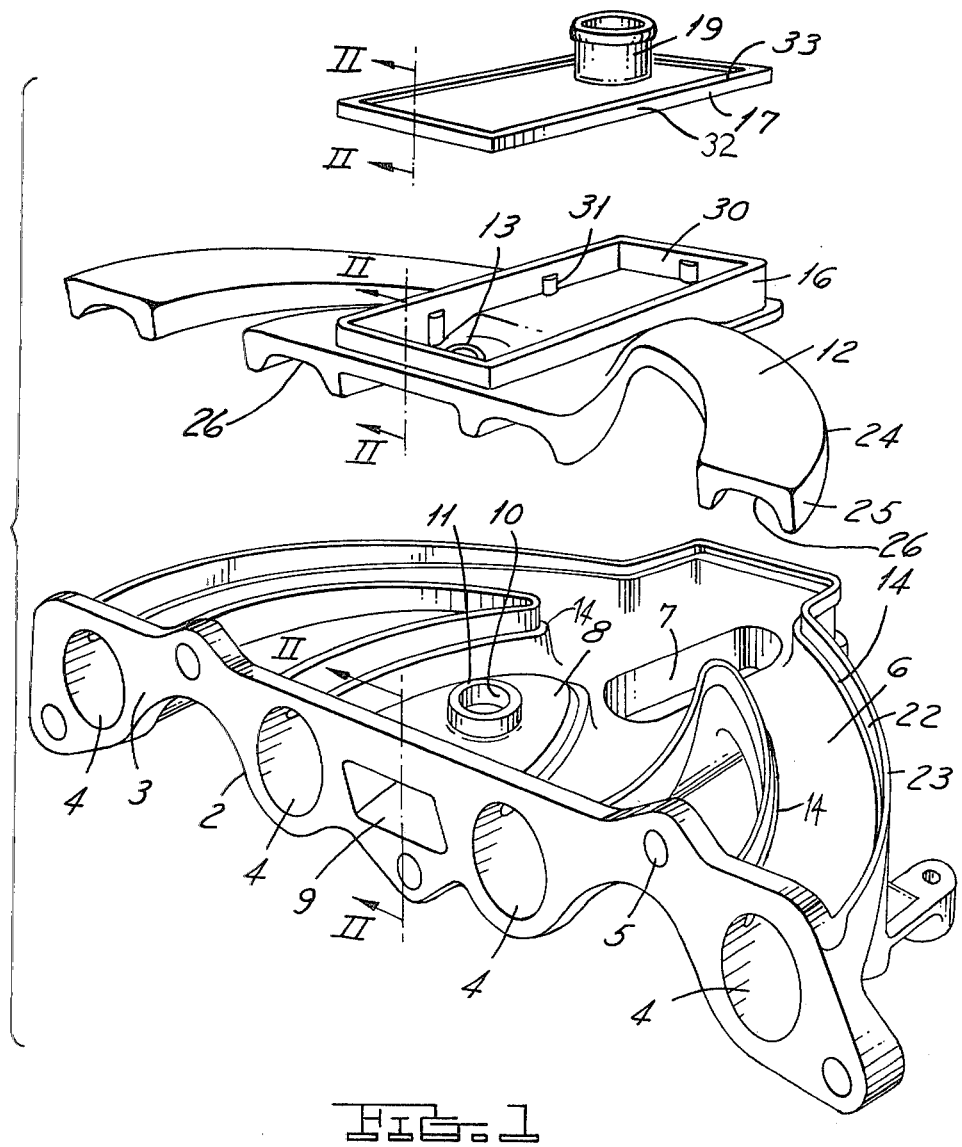
FIG. 1 is an "exploded" perspective view of an intake manifold for an internal combustion engine in accordance with the invention.

Referring to the drawings, the intake manifold comprises a first body part 1 formed from pressure cast aluminum. The first body part 1 includes an integral mounting flange 2 which has a flat front face 3 in which are formed four apertures constituting outlets ports 4. The mounting flange 2 also includes five bolt holes 5 by means of which the manifold may be mounted on an internal combustion engine with the outlet ports 4 in registry with the cylinder inlet ports of the engine. Open channels 6 extend rearwardly away from the mounting flange 2 and communicate with a common orifice 7 in the first body part 1 which, in use, is connected to a carburetor. A water chamber 8 is formed integrally with the first body part 1. As best seen in FIG. 2, the water chamber 8 communicates at one end with a port 9 in the mounting flange 2 and at an opposing end with another port 10 which is formed in an upstanding neck 11. A shoulder 14 formed on the inner side face 22 of the body part 1 adjacent the peripheral edge 23.

A second body part 12, also formed as an aluminum pressure casting, and has open channels 26 formed therein. The second body part 12 is mounted on the first body part 1 rearwardly of the mounting flange 2 and overlies the open channels 6 in the first body part to form a closure therefor. The first and second body parts 1 and 2 therefore define four gas conduits which each extend from the common orifice 7 to the respective outlet ports 4 in the mounting flange. The second body part has an outer peripheral edge 24 which conforms to the shape of the peripheral edge 23 of the first body part, and the second body part 12 is supported in the first body part 1 by the shoulder 14 so that a side face 25 of the second body part 12 adjacent the edge 23 faces the inner side face 22 of the first body part.

The second body part also defines an aperture 13 which surrounds the neck 11 of the water chamber 8, as best seen in FIG. 2.

The first and second body parts 1 and 12 are sealed together by an outer seam which connects the side faces 22 and 25 of the two body parts, and an inner seam which connects the inner side face 27 of the second body part 12 adjacent the edge of the aperture 13 to the outer side face 28 of the first body portion adjacent the edge of the port 10. Both these seams are accessible from the exterior of the assembly and can therefore easily be formed and inspected using a welding process or an adhesive. The fact that the two seams lie in a common plane facilitates the use of automatic electron beam welding apparatus. Where an adhesive is used, it may be forced into the gap between the side faces 22 and 25 from the exterior of the assembly, thus reducing the risk of fouling the interior surfaces of the manifold. The aperture 13 in the second body part 12 is surrounded by an upstanding wall 16. On the inner side face 30 of the wall 16 adjacent the peripheral edge thereof are formed a series of shoulders 31 which support a third pressure cast aluminum body part 17. The wall 16 surrounds the third body part 17 such that the side face 32 adjacent the peripheral edge 33 of the third body part 17 faces the side face 30 of the wall 16. The second and third body parts 12 and 17 are sealed together by a seam which connects the side faces 30 and 32. This seam is also accessible from the exterior of the assembly and can therefore be formed using an adhesive or a welding technique. The third body part 17 includes an opening 19 in the form of an outlet neck to which a hose can be connected. The second and third parts 12, and 17 thus form a further water chamber 18 which communicates with the chamber 8.

The manifold is assembled by first connecting the first and second body parts 1 and 12 along shoulder 14. The third body part 17 is then similarly attached to the second body part 12 thus completing the assembly of the manifold. A water jacket is thus formed by the chambers 8 and 18 as an integral part of the manifold rather than as a separate component, and without internal seals.

Since the manifold is formed from pressure cast components with good quality finishes, the manifold can be bolted directly onto an engine block without further machining, the front face of the mounting flange being separated from the engine block by means of a gasket. Since the forces applied to the manifold by the securing bolts are taken only by the first body part 1, there is little or no risk of these forces causing separation of the three body parts.

Variations and modifications of the present invention are possible without departing from its spirit and scope which is defined by the appended claims.

The embodiments of the inventions in which an exclusive property or privilege is claimed are defined as follows:

1. A manifold for an internal combustion engine comprising:
   a first body part formed as an integral casting having a mounting flange for the manifold;
   a plurality of open channels communicating with respective apertures in the mounting flange and a water chamber communicating with a part in the flange and a further port in the first body part;
   a second body part formed as an integral casting overlying the channels such that the first and second body parts define a plurality of gas conduits effecting communication between the apertures and a common orifice formed through at least one of the body parts;
   a seal formed by the first and second parts being sealed together along opposed side faces adjacent their outer peripheral edges;
   the second body part defining an aperture which surrounds said further port in the first body part, a second seal being formed by the second body part being sealed to the first body part along side faces the adjacent edges of the aperture and the further port;
   a third body part which coacts with said second body part with said coaction defining a second water chamber effecting communication between the aperture in the second body part and an opening defined in the third body part, the third body part having a side face adjacent its outer peripheral edge which faces a complementary side face of said second body part; the seal is formed by the third said side face of said third body part being sealed to said side surface of said second body part.

2. A manifold for an internal combustion engine comprising:
   a first body part formed as an integral casting having a mounting flange for the manifold;
   a plurality of open channels formed in said first body part communicating with respective apertures in the mounting flange and a water chamber communicating with a port in the flange and a further port in the first body part;
   said first body part having outer peripheral edges defining the edge of the open channels with a side wall as part thereof;
   a second body part formed as an integral casting with a plurality of channels formed therein and positioned to overlie said channels of said first body part such that the channels of the first and second body parts join together to define a plurality of gas conduits effecting communication between the apertures and a common orifice formed through at least one of the body parts;
   said second body part having peripheral edges with a side wall facing said side wall of said first body part;
   a seal formed by the first and second parts being sealed together along opposed side faces adjacent their outer peripheral edges;
   the second body part defining an aperture which surrounds said further port in the first body part, a second seal being formed by the second body part being sealed to the first body part along side faces the adjacent edges of the aperture and the further port;
   a third body part which coacts with said second body part with said coaction defining a second water chamber effecting communication between the aperture in the second body part and an opening defined in the third body part, the third body part having a side face adjacent its outer peripheral edge which faces a complementary side face of said second body part; the seal is formed by the third said side face of said third body part being sealed to said side surface of said second body part.

3. A manifold according to claim 2 wherein the seal between the first and second body parts lies in a plane.

4. A manifold according to claim 2 wherein each seal between the first and second body parts lie in a plane.

5. A manifold according to claims 2, 3, 4 wherein the body parts are connected together by electron beam welding.

6. A manifold according to claim 2 wherein:

said first body part has said side wall inwardly facing said channels of said first body part;

said second body part has an outwardly facing side wall which faces said side wall of said first body part.

7. A manifold as defined in claim 6 wherein:

said first body part has a shoulder inwardly extending toward said channels of said first body part and below said side wall of said first body part to support said peripheral edges of said second body part.

* * * * *